June 29, 1948. S. C. CORONITI 2,444,153
POWER CONTROL SYSTEM
Filed Oct. 4, 1945 2 Sheets-Sheet 1
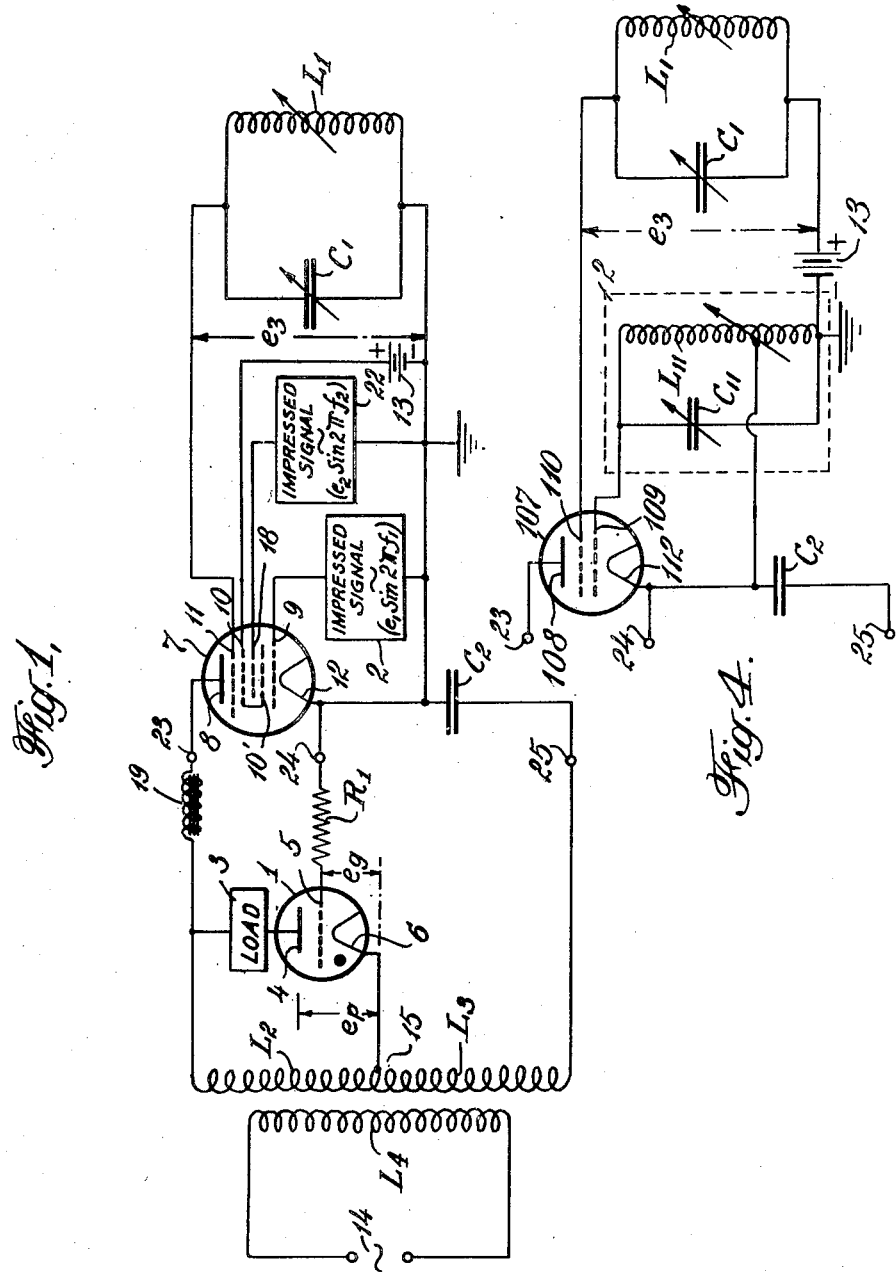
INVENTOR
SAMUEL C. CORONITI
BY
ATTORNEY

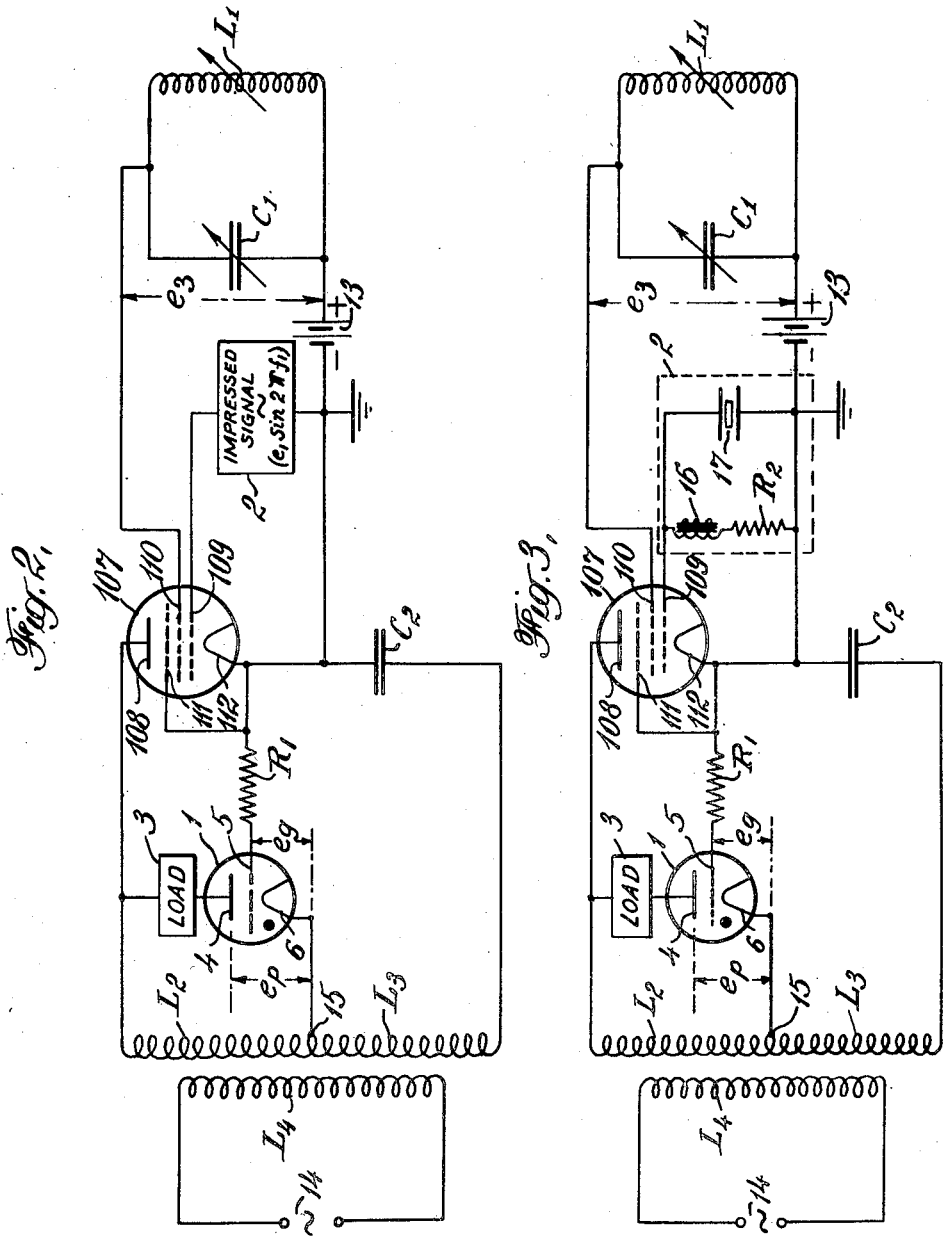

Patented June 29, 1948

2,444,153

UNITED STATES PATENT OFFICE 2,444,153

POWER CONTROL SYSTEM

Samuel C. Coroniti, Johnson City, N. Y., assignor to General Aniline & Film Corporation, New York, N. Y., a corporation of Delaware Application October 4, 1945, Serial No. 620,212

10 Claims. (Cl. 175—363)

This invention relates to control of electric power and it is especially adapted to the control of power to a load in response to minute changes in a given quantity. More particularly, the invention comprises an electric control system wherein changes in frequency control the power to a load.

In industrial applications it is frequently required that comparatively large amounts of electric power shall be controlled by relatively small changes in some variable quantity. For example, it may be desired that the level of a liquid in a tank be maintained constant regardless of variations in the rate at which the liquid is withdrawn from the tank. By means of the present invention any change in liquid level may, for example, be caused to effect a corresponding change in a circuit element in a tuned circuit or alternatively to effect a corresponding change in frequency of an oscillation or signal source. The result of such a change in frequency in the system of this invention will result in a corresponding change in current supplied to the load but at much greater power than was involved in the change of frequency in the control circuit. Again, it frequently is required to control large currents, perhaps to operate mechanical devices at a considerable distance from the control point. Such remote control may be via wire connections or by radio. An instance of the latter comprises the control of aircraft in flight from the ground. The system of the present invention can readily be employed for such purpose by connecting it to a receiver of radio waves transmitted from the ground. In that event a change in transmitted frequency may be employed to control the power furnished to an electrical load on the aircraft.

Briefly, the present invention, which comprises a system for controlling electric power furnished to a load, may include a gas-filled grid-controlled discharge tube and a vacuum tube so coupled together that changes in effective plate-to-cathode impedance (preferably resistance) of the vacuum tube effect corresponding changes in the output or load current of the discharge tube. The vacuum tube may include one or more control grids, each of which is connected to a control circuit. Either or both of the control circuits may comprise a local oscillatory circuit such as an oscillator, a radio antenna, or other source of impressed signals, a piezoelectric circuit, or other tuned circuit. If, now, the load is connected in the plate circuit of the discharge tube, and the grid and plate circuits thereof are properly coupled to a source of alternating current and to the vacuum tube, relatively minute changes in frequency of at least one of the control circuits connected to the vacuum tube, or in frequency of the potential impressed thereon, will result in a change in amplitude of such potential and cause a proportional change in phase angle between the grid and plate potentials of the discharge tube and thus in power furnished to the load.

A more complete understanding of the invention will be had by reference to the drawings, in which:

Fig. 1 is a circuit diagram of the control system of the present invention including several possible sources of control;

Fig. 2 is a circuit diagram of a simplified embodiment of the arrangement of Fig. 1;

Fig. 3 is a circuit diagram of a modification of the invention employing a fixed frequency oscillator;

Fig. 4 shows one type of oscillator which could be substituted in the arrangement of Fig. 1.

A somewhat comprehensive embodiment of the control system of the present invention is illustrated in Fig. 1. A suitable source $14$ of alternating current, such as 120 volts, 60 cycles, is connected to the primary $L_4$ of a coupling transformer having a secondary comprising coils $L_2$, $L_3$. In the present example this secondary comprises a single winding having a center tap $15$. The gaseous discharge rectifier tube $1$ which, for example, may be of the "Thyratron" type includes a control grid $5$, a cathode $6$ and an anode $4$. The load $3$, the current to which it is desired to control, is connected in the anode circuit of discharge tube $1$, specifically between anode $4$ and one terminal of secondary $L_2$, the other terminal of which (tap $15$ in this instance) is connected to cathode $6$.

The grid circuit of the discharge tube includes grid $5$, resistor $R_1$, capacitor $C_2$, inductance $L_3$ and cathode $6$. Inductance $L_3$ is coupled to primary $L_4$ of the power transformer. The alternating potential $(e_g)$ is the effective or resultant potential impressed between the grid $5$ and cathode $6$, and the A. C. potential $(e_p)$ is the effective or resultant potential appearing between the anode $4$ and cathode $6$. Inductance coil $L_3$ may be a separate winding and not a continuation of inductance $L_2$ if desired. The number of turns and size of wire of coils $L_2$ and $L_3$ will depend upon the voltage and current requirements of the discharge tube $1$ and the load $3$, although these coils should preferably be of effectively equal inductance. The value of capacitor $C_2$ is chosen to provide a suitable normal phase relation between the grid and plate electrodes of rectifier tube $1$ in accordance with practice well known in the art. The value of resistor $R_1$ should be such as suitably to limit the grid current of tube 1. For example, 5,000 ohms has been used. Additionally, the values of $R_1$ and $C_2$ should be such that their product provides a much lower time constant than the period of the power supply. If the value of $R_1$ is high, such as 100,000 ohms or more, the phase control of the "Thyratron" tube 1, will be affected as explained in my article published in the Proceedings, Institute of Radio Engineers, December, 1943, pp. 653–656.

It is known that when the grid potential ($e_g$) is in phase with the plate potential ($e_p$) the maximum value of plate current ($I_p$) of a gas-filled grid-controlled discharge tube is obtained (e.g. the longest period of conductivity lasting the entire positive half cycle); and that when the grid potential is 180° out of phase with the plate potential the plate current is zero. It is further known that the plate current of such discharge tubes may be controlled by shifting the phase angle of the grid potential with respect to the plate potential. If it be desired, for example, that the control provide for both increase and decrease of plate current, the constants of the elements in the grid circuit may be chosen such that normally the plate potential leads the grid potential by say 90°. In that event a decrease or increase of phase angle will result, respectively, in an increase or decrease of plate current. The theory of control of a gas-filled, grid-controlled discharge tube by change of phase angle is set forth in considerable detail in my copending application for U. S. Letters Patent Ser. No. 496,383, filed July 28, 1943, now Patent No. 2,413,218, issued December 24, 1946.

In accordance with the present invention the phase angle between the grid an anode potentials of the discharge tube is controlled in response to variation in frequency. This control is effected in the following manner: The variation in frequency is caused to vary an impedance connected between the grid of the discharge tube, and a suitable potential terminal of the supply this impedance comprising the dynamic inter-electrode impedance of a vacuum tube. Such variable and controllable impedance, preferably of a resistive characteristic, is here introduced by vacuum tube 7, of which the plate 8 and cathode 12 are connected to the supply and grid circuits, respectively, of discharge tube 1. Tube 7 is, in this instance, furnished with five grids 9, 10', 18, 10 and 11, spaced in the order stated from the cathode 12. A tube suitable for this purpose is the so-called pentagrid converter, of which type "6SA7" is an example. The cathode 12 of tube 7 and cathode 6 of tube 1 are shown diagrammatically and would usually be of the indirectly heated type, the heater or filament being energized by a suitable source of alternating current, not shown. Screen grids 10' and 10 are connected together and biased by a suitable direct current source such as the battery 13, as is customary in the art. Grids 9 and 18 function as control grids, as will now be explained.

Between grid 9 and cathode 12 and grid 18 and cathode 12 of tube 7 are connected "impressed signal" sources 2 and 22, respectively. This term is intended to cover broadly any of several circuits or systems which, for present purposes are equivalent. Briefly, an "impressed signal" as here employed may include any effective source of oscillating voltage such as a local oscillator, an antenna tuned circuit and suitable amplifier or other source of oscillations, or even a simple tuned circuit connected, as shown, to a control grid. In other words the circuit elements or voltage coupling impedance at 2 and 22 must be such as ot effect a change in voltage on the grid with change of frequency of the impressed signal from which such voltage is derived. Since in this system it is intended that the grid draw current on the positive half-cycles of the impressed signal voltage, enough power must be provided on the grid to drive the tube. This is actually a small amount of power, but it would be more than that normally derived directly from a radio receiving antenna, for example. Connected between suppressor grid 11 and cathode 12 of tube 7 is a tuned circuit including a capacitance $C_1$ and inductance $L_1$ connected in parallel with each other. Either or both of these two elements may be adjustable and alternatively they might be connected in series. Source 13 of direct-current biasing potential is connected with its negative terminal to the cathode 12 and its positive terminal to screen grid 10. The voltage of this bias battery determines the average grid voltage on grid 10 and thus, if correctly chosen with any given tube assures that the fluctuations of high-frequency voltage shall fall on the desired portion of the characteristic curve.

The characteristics of the L—C circuit $L_1$—$C_1$ should be such that it tunes very sharply, viz., has a high Q, or efficiency whereas the characteristics of the voltage coupling impedances, or other voltage sources, 2 and 22 preferably should be such that they tune rather broadly, viz., have a low Q. Then, if signal source 2 be tuned to frequency $f_1$ and signal source 22 be tuned to a second frequency $f_2$, oscillatory circuit $L_1C_1$ may be tuned to either the sum or the difference of the frequencies $f_1$ and $f_2$, although it is preferable that this circuit be tuned to the difference frequency, which may be called a beat frequency. Any variation of $f_1$ or $f_2$ will then greatly affect the impedance of the $L_1C_1$ circuit and hence will affect the amplitude of potential $e_3$ on grid 11, which in turn will affect the plate impedance of tube 7.

Likewise, with the impressed signals at a fixed frequency if any change is made to capacitance $C_1$ or to inductance $L_1$, the effective impedance of tube 7 will be changed. Hence the power to load 3 may alternatively be controlled by causing any desired variable to change $C_1$ or $L_1$, the frequencies $f_1$ and $f_2$ of voltages $e_1$ and $e_2$ being fixed, in that case. Again, if it be desired to maintain the load current at a constant value, the load 3 may be uni-controlled (mechanically coupled) with the variable element $C_1$ or $L_1$.

The control system shown in Fig. 1 has a large number of applications which will occur to those skilled in the art. A few of these may here be mentioned. For example, signal sources, 2 and 22 may comprise, as well as oscillators, radio receiving antennas (followed by suitable amplifiers), or receiver circuits coupled thereto. Then, the power to load 3 may be controlled remotely by variation of the frequency of the transmitted radio waves, which are received and impressed on either or both of grids 9 and 18. Any other source or sources of voltage at variable and controllable frequencies may likewise be impressed on either or both of grids 9 and 18. Such remote source of oscillations after reception and coupling to an impedance in the impressed signal source is equivalent, functionally, to a local source of oscillations.

If signal source 2 comprises an oscillator circuit, it may, for example, be of the Hartley type illustrated within the box 2 in Fig. 4, so that local oscillations of a fixed frequency are generated and impressed on grid 9 (Fig. 1). In this event a potential of variable and controllable frequency from source 22 may be impressed on grid 10 to control the power; or if the frequency of signal source 22 remains fixed, the power may be controlled by variation of inductance or capacitance in the oscillatory circuit comprising the oscillator circuit 2.

Instead of the oscillator circuit just described, a crystal-controlled oscillatory circuit as shown within the box 2 of Fig. 3, may be used in the system of Fig. 1. Obviously a large number of combinations of fixed and variable frequency control circuits connected to a multi-grid tube may be employed as desired to effect control of the load in the anode circuit of discharge tube 1.

The frequency of the power supply (which has here been assumed to be 60 cycles) should be remote from the frequency to which any of the signal sources or oscillatory circuits is tuned and from any beat frequency employed for control. Such beat or other frequency impressed on the control grid should be considerably higher than the frequency of the power supply. For example it might be of the order of 15 times higher. A choke coil 19 may be connected between the plate 8 of the control tube 7 and the A. C. source, as shown, to prevent oscillatory energy from entering the anode circuit of tube 1, and this choke should be designed to present a high impedance at the oscillatory frequencies and a low impedance at the power frequency. This applies to all of the systems herein described.

The control system illustrated in Fig. 2 is a simplified form of that more generally shown in Fig. 1. In this instance because only one source of impressed signal 2 is shown generally, it is possible here to use a tube 107 having two or three grids, rather than a tube having more grids as represented in Fig. 1. As far as the control is concerned, only two grids are effective, the third grid 111 being a cathode connected suppressor grid. This, while preferable to obtain the best operation, can be omitted.

The description heretofore given in respect to Fig. 1 applies equally to the system of Fig. 2 wherein the same reference characters have been used to represent the same circuit elements. Tube 107 such as that here represented may be of the variably mu type such as a 6SK7. By employing such a tube and varying the effective impedance thereof by changing the frequency of oscillations impressed on grid 109, whether they be received from a remote transmitter, or whether they be generated locally or otherwise, the power to the load 3 may be controlled over a wide range merely by variation of the frequency of the applied potential. Likewise, as above explained in connection with Fig. 1, the impedance of tube 107 may be controlled by impressing a potential of fixed frequency on grid 109 and varying the tuning of circuit $L_1C_1$ by variation of the inductance or capacitance, or both, thereof which effectively varies the amplitude of potential $e_3$ impressed on grid 110.

The control system illustrated in Fig. 3 is a form of that represented in Fig. 2, differing only in the representation of the circuit elements illustrated generally in the impressed signal source 2. These circuit elements comprise a suitable piezo-electric crystal 17, a radio frequency choke 16 and a resistor $R_2$. The crystal is, as shown, connected between grid 109 and cathode 112 of tube 107, and series-connected choke 16 and resistor $R_2$ are connected in shunt to the crystal.

Such circuit arrangement will result in oscillations being generated at the frequency of the oscillatory crystal circuit 2.

The sharply resonant oscillatory circuit $C_1$—$L_1$ will develop a voltage only at a particular resonant frequency determined by the adjustment of either $C_1$ or $L_1$. In this arrangement there is only one locally generated frequency, which is fixed by the crystal, therefore, control actuation is intended by means of physical adjustment of either $C_1$ or $L_1$. In setting up the control system for operation the circuit connected to the control grid 110 may be detuned slightly from the crystal frequency so that the control tube impedance produces the necessary phase shift preventing ignition in the gaseous discharge tube. Now, a slight readjustment of the capacity $C_1$ or the inductance $L_1$ toward a resonant frequency, which corresponds to the crystal frequency, will produce the necessary anode-cathode impedance of the control tube to cause ignition of the discharge device at a desired portion of the operating half cycle.

In constructing a control circuit, as shown in Fig. 3, for example, the tube 107 may be of type 6SK7, and, as stated, the crystal 17 together with its associated choke 16 and resistor $R_2$ which may be of 5 megohms, is adjusted to oscillate at 3504 kilocycles. Bias battery 13 may be of 67.5 volts. If, then, variable condenser $C_1$ is of a maximum capacitance of 50 mmfds. and inductance $L_1$ comprises, say, 23 turns of No. 24 enamel-covered copper wire wound on a form one inch in diameter, an excellent control of the current in load 3 will result from a variation of as little as 15 mmfds. in the capacitance of condenser $C_1$.

Another modification of the control system of Fig. 1 is shown in Fig. 4 wherein the portion of the system of Fig. 1 represented to the right of terminals 23, 24 and 25 as seen in the drawing, is replaced. The resulting circuit arrangement is quite similar to that of Fig. 3, the difference being that the crystal oscillator circuit represented within the box 2 of Fig. 3 is, in Fig. 4, replaced by the well known Hartley oscillator circuit. As previously indicated in connection with Fig. 1, the current through the load 3 may with this system be controlled, preferably, by varying the constants of one, or both, of inductance $L_{11}$ and capacitance $C_{11}$. As before, the power may also be controlled through variation of $L_1$ or $C_1$, or both, while the frequency of the oscillator 2 is permitted to remain fixed. As in the systems of Fig. 2 and Fig. 3, the circuit $L_1C_1$ should be nominally tuned to the same frequency as that of oscillatory circuit 2.

In practical applications of the control system of this invention the mentioned variations in capacitance or inductance in order to control the load, may be effected in accordance with any desired variable quantity. Such quantity may obviously be a mechanical motion, a change in dimension, pressure, temperature, illumination, level of a liquid, electrical value, or any other variable. Although usually it is most convenient to vary the capacitance of a condenser in response to the changing condition it is obvious that the effective inductance of coil $L_1$ may as well be varied, or both together, if desired. The selection of a suitable type of gas-filled grid-controlled discharge tube, generally known as a Thyratron in the art would depend upon the requirements of load 3, and therefore the design of the transformer and the value of resistor R₁ and of condenser C₂ will be chosen accordingly. If the load is a comparatively small one and a Thyratron tube such as type FG57 be employed condenser C₂ may have a capacity of .05 mmfd. On the other hand, the remaining elements of the control system may remain the same regardless of the ultimate power to be controlled because their function is merely to vary and control an impedance effectively connected to the Thyratron tube so as to vary the phase angle between the grid and anode potentials of the Thyratron.

What is claimed is:

1. In a system for controlling in response to change in a control frequency the electric power furnished to a load, the combination which includes a gas-filled discharge tube of the grid-controlled type having a grid, an anode and a cathode, means for connecting a load in the anode circuit of said discharge tube, means for furnishing electric power to said tube and thereby to said load, and means for controlling the power to said load by variation of the phase relation between the grid and anode of said tube in response to change in said frequency, comprising a phase control circuit and a vacuum tube having a plate, a cathode and at least two control electrodes, input circuits for said control tube each connected to one of said control electrodes, a resonant circuit tuned to a predetermined frequency in one of said input circuits, a signal input channel in the other of said input circuits, said input circuits being electronically coupled, whereby the effective impedance of said tube is a function of response of said resonant circuit, said response being governed by the frequency of the signal applied to said input channel, and circuit means for coupling said control tube to said phase control circuit whereby operative actuation of said discharge device is effected upon receiving in said input channel a signal having a frequency corresponding to said predetermined frequency.

2. In a system for controlling in response to change in a control frequency the electric power furnished to a load, the combination which comprises a gas-filled discharge tube of the grid-controlled type having anode, cathode and grid electrodes, a power input including a coil having two terminals, a connection from the cathode of said tube to the effective mid-point of said coil, a connection from a first terminal of said coil through said load to the anode of said tube, a condenser, a connection from the other terminal of said coil through said condenser to the control grid of said tube, a vacuum tube having at least three grids, a plate and a cathode, a connection from the plate of said vacuum tube to the first terminal of said coil, a connection from the cathode of said vacuum tube to the control grid of said discharge tube, a tuned circuit connected between a first of the grids and the cathode of said vacuum tube, a first input circuit including an oscillation source connected between a second of said grids and the cathode of said vacuum tube, a second input circuit including an oscillation source connected between the third of said grids and the cathode of said vacuum tube, said input circuits being tuned to produce a beat frequency and said tuned circuit being nominally tuned to said beat frequency, and means for varying the frequency of oscillations impressed on at least one of the grids of said vacuum tube whereby to control the power to said load.

3. In a system for controlling in response to change in resonant of a tuned circuit the electric power furnished to a load, the combination which comprises a gas-filled discharge tube of the grid-controlled type having an anode, a grid and a cathode, an alternating current power source for said tube and said load, means associated with said source for establishing at two terminals thereof alternating potentials of opposite phase, said cathode being coupled to said source at a substantially neutral phase point with respect to said two terminals, a connection from the first of said terminals through said load to the plate of said tube, a condenser, a connection from the second of said terminals through said condenser to the grid of said tube, a vacuum tube having at least two grids, a plate and a cathode, a connection from the plate of said vacuum tube to said first terminal, a connection from the cathode of said vacuum tube to the grid of said rectifier tube, a tuned circuit connected between a first of the grids and the cathode of said vacuum tube, an oscillatory circuit including a source of oscillations connected between a second of said grids and the cathode of said vacuum tube, one of said circuits having a considerably sharper tuning characteristic than the other, and means for varying the tuning of one of said circuits whereby to control the power to said load.

4. In a system for controlling in response to change in a generator frequency the electric power furnished to a load, the combination which comprises a gas-filled discharge tube of the grid-controlled type having an anode, a grid and a cathode, an alternating current power source for said rectifier and said load, means associated with said source for establishing at two terminals thereof alternating potentials of opposite phase, said cathode being coupled to said source at a substantially neutral phase point with respect to said two terminals, a connection from the first of said terminals through said load to the anode of said tube, a condenser, a connection from the second of said terminals through said condenser to the grid of said tube, a vacuum tube having at least two grids, a plate and a cathode, a connection from the plate of said vacuum tube to said first terminal, a connection from the cathode of said vacuum tube to the grid of said discharge tube, a tuned circuit connected between a first of the grids and the cathode of said vacuum tube, an oscillatory circuit including a source of oscillations connected between a second of said grids and the cathode of said vacuum tube, one of said circuits having a considerably sharper tuning characteristic than the other, and means for varying the frequency of said oscillations whereby to control the power to said load.

5. In a power control system a source of alternating current potential, a load to be energized therefrom, a gaseous discharge device in series between said source and said load, said device having an anode, a cathode and a control grid for actuating conductivity thereof, means for controlling the conductivity of said device, comprising circuit means for impressing a potential on said grid in operative phase relation with respect to the potential between said anode and said cathode, means for controlling said phase relation within a desired phase angle difference, including a vacuum tube having anode, cathode and a plurality of control electrodes and means associated with said control electrodes for altering the effective conductivity of said tube and thereby said phase angle in accordance with frequency variations of a signal impressed on one of said control electrodes.

6. In a power control system a source of alternating current potential, a load to be energized therefrom, a gaseous discharge device in series between said source and said load, said device having an anode, a cathode and a control grid for actuating conductivity thereof, means for controlling the duration of conductivity of said device within operating half cycles comprising circuit means for impressing a potential on said grid in operative phase relation with respect to the potential between said anode and said cathode, means for controlling said phase relation within a desired phase angle difference, including a vacuum tube having anode, cathode and a plurality of control electrodes and means associated with said control electrodes for altering the effective conductivity of said vacuum tube and thereby said phase angle in accordance with a change in frequency of a signal impressed on one of said control electrodes.

7. In a power control system a source of alternating current potential, a load to be energized therefrom, a gaseous discharge device in series between said source and said load, said device having an anode, a cathode and a control grid for actuating conductivity thereof, means for controlling the duration of conductivity of said device within operating half cycles comprising circuit means for impressing a potential on said grid in operative phase relation with respect to the potential between said anode and said cathode, means for controlling said phase relation within a desired phase angle difference, including a vacuum tube having anode, cathode and a plurality of control electrodes and means associated with said control electrodes for altering the effective anode to cathode impedance of said tube and thereby said phase angle in accordance with frequency variations of a signal impressed on one of said control electrodes.

8. In a power control system a source of alternating current potential, a load to be energized therefrom, a gaseous discharge device in series between said source and said load, said device having an anode, a cathode and a control grid for actuating conductivity thereof, means for controlling the duration of conductivity of said device within operating half cycles comprising circuit means for impressing a potential on said grid in operative phase relation with respect to the potential between said anode and said cathode, means for controlling said phase relation within a desired phase angle difference, including a vacuum tube having anode, cathode and a plurality of control electrodes and means associated with said control electrodes for impressing simultaneously two signals each of a predetermined frequency and thereby producing a difference frequency and altering the effective anode to cathode impedance of said tube and thereby said phase angle in accordance with the generation of said difference frequency.

9. In a system for controlling in response to change in a control frequency the electric power furnished to a load, the combination which includes a gaseous discharge device of the grid controlled type having a grid, an anode and a cathode, means for connecting a load in the anode circuit of said device, means for furnishing electric power to said device and thereby to said load, and means for controlling the power to said load by variation of the phase relation between the grid and anode of said device in response to change in said frequency, comprising a phase control circuit and a vacuum tube having a plate, a cathode and at least three control electrodes, input circuits for said control tube, each connected to one of said control electrodes, a resonant circuit tuned to a predetermined frequency in one of said input circuits, a signal input channel in each of the other of said input circuits, said input circuits being electronically coupled, whereby the effective impedance of said tube is a function of response of said resonant circuit, said other input channels being energized with signals differing in frequency thereby producing a difference frequency, and circuit means for coupling said control tube to said phase control circuit whereby operative actuation of said discharge device is effected upon signals in said input channels producing a difference frequency corresponding to said predetermined frequency.

10. In a system for controlling in response to change in a control frequency the electric power furnished to a load, the combination which includes a gaseous discharge device of the grid controlled type having a grid, an anode and a cathode, means for connecting a load in the anode circuit of said device, means for furnishing electric power to said device and thereby to said load, and means for controlling the power to said load by variation of the phase relation between the grid and anode of said device in response to change in said frequency, comprising a phase control circuit and a vacuum tube having a plate, a cathode and at least three control electrodes, input circuits for said control tube and each connected to one of said control electrodes, a resonant circuit tuned to a predetermined frequency in one of said input circuits, a signal input channel in each of the other of said input circuits, said input circuits being electronically coupled, whereby the effective impedance of said tube is a function of voltage developed in said resonant circuit, said input channels being energized with signals differing in frequency thereby producing a difference frequency, one of said signals being of a fixed frequency and the other of said signals being of a variable frequency comprising said control frequency, and circuit means for coupling said control tube to said phase control circuit whereby operative actuation of said discharge device is effected upon variation of said control frequency producing a difference frequency corresponding to said predetermined frequency.

SAMUEL C. CORONITI.

REFERENCES CITED

The following references are of record in the file of this patent:

UNITED STATES PATENTS

| Number | Name | Date |
| --- | --- | --- |
| 1,960,217 | Unger | May 22, 1934 |
| 1,995,404 | Stoller | Mar. 26, 1935 |
| 2,137,148 | Suits | Nov. 15, 1938 |
| 2,233,706 | Kalmus | Mar. 4, 1941 |
| 2,241,569 | Zakarlias | May 13, 1941 |
| 2,248,197 | Rath | July 8, 1941 |
| 2,261,286 | Rankin | Nov. 4, 1941 |
| 2,269,687 | Rath | Jan. 13, 1942 |
| 2,274,184 | Bach | Feb. 24, 1942 |
| 2,325,092 | Andrews | July 27, 1943 |
| 2,361,664 | Stone | Oct. 31, 1944 |
| 2,410,982 | Koch | Nov. 12, 1946 |